United States Patent
Elving et al.

(10) Patent No.: US 7,774,473 B2
(45) Date of Patent: Aug. 10, 2010

(54) SYSTEM AND METHOD FOR STICKY ROUTING OF REQUESTS WITHIN A SERVER FARM

(75) Inventors: Christopher H. Elving, Santa Clara, CA (US); Arvind Srinivasan, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 2229 days.

(21) Appl. No.: 10/209,039

(22) Filed: Jul. 31, 2002

(65) Prior Publication Data

US 2004/0024881 A1 Feb. 5, 2004

(51) Int. Cl.
  *G06F 15/16* (2006.01)
  *G06F 15/173* (2006.01)
(52) U.S. Cl. .................. 709/227; 709/225; 709/228
(58) Field of Classification Search ................ 709/203, 709/219, 227, 228, 235, 242, 245; 718/105; 713/153
See application file for complete search history.

(56) References Cited

U.S. PATENT DOCUMENTS

| | | | | |
|---|---|---|---|---|
| 5,812,671 | A * | 9/1998 | Ross, Jr. ................ | 713/153 |
| 5,931,917 | A * | 8/1999 | Nguyen et al. ........... | 709/250 |
| 6,473,802 | B2 * | 10/2002 | Masters ................. | 709/229 |
| 6,606,708 | B1 * | 8/2003 | Devine et al. ............ | 726/8 |
| 6,772,333 | B1 * | 8/2004 | Brendel ................ | 713/153 |
| 6,947,992 | B1 * | 9/2005 | Shachor ................ | 709/228 |
| 2003/0014526 | A1 * | 1/2003 | Pullara et al. ........... | 709/227 |
| 2004/0024880 | A1 | 2/2004 | Elving et al. | |

OTHER PUBLICATIONS

Amir et al., "What is mod_backhand ?" http://web.archive.org/web/20020604064624/www.backhand.org/mod_backhand/, Jun. 4, 2002, (6 pages).
"Frequently Asked Questions," http://web.archive.org/web/20020818154501/www.backhand.org/mod_backhand/FAQ.shtml, Aug. 18, 2002, (6 pages).
Theo Schlossnagle, "Mod Backhand—Course Notes," John Hopkins University, Apr. 5, 2001, (13 pages).
Theo Schlossnagle Mod Backhand presentation, John Hopkins University, Apr. 5, 2001, (24 pages).

* cited by examiner

*Primary Examiner*—Aaron Strange
(74) *Attorney, Agent, or Firm*—Robert C Kowert; Meyertons, Hood, Kivlin, Kowert & Goetzel, P.C.

(57) ABSTRACT

An upstream device, such as a load balancer or router within a server farm, may perform sticky routing of session requests to the servers handling those sessions by generating unique ID(s) identifying how requests may be routed through the server farm. Upstream devices through which travels a request that is not associated with a session on a server of the server farm may generate one or more unique IDs identifying how the request is routed through the server farm. The server handling the request may form a session ID and return that session ID and the unique ID(s) to the client that originated the new request and session. Clients may then send the session ID and unique IDs with clients requests for that session. Upon receiving requests corresponding to established sessions, the upstream devices may then identify routing information from the unique ID(s) and route the request accordingly.

31 Claims, 6 Drawing Sheets

SYSTEM AND METHOD FOR STICKY ROUTING OF REQUESTS WITHIN A SERVER FARM

BACKGROUND OF THE INVENTION

1. Field of the Invention

The present invention relates to computer networks and in particular to handling client requests in systems having multiple servers.

2. Description of Related Art

On computer networks, nodes may interact through requests for data, services, or other resources. Client nodes may generate requests and server nodes may service those requests. Nodes may be stand-alone computers, servers, or other computing devices, as well as virtual machines, threads, processes, or other network participants. To handle a greater volume of requests, a plurality of servers may be allocated to responding to one or more types of requests and the servers as a group may be referred to as a server farm. For example, a bank, ticket office, or some other organization may use a server farm to process requests from clients. The servers may be web servers on the Internet responding to web clients.

To provide coherent service to clients, state or session information may be collected and used by servers, so that their response to a given client may depend on session data for the client in the server farm. For example, session information may be used to implement a "shopping cart" used across multiple requests over one or more servers. It may be more efficient to store the session information on a single server within the server farm, rather than disperse that information, and ensure that the corresponding server services the requests from the associated client.

A typical system may have a unique session ID assigned to correspond to collected client session information. Initially, requests do not contain session IDs since there is not yet a session formed with the server farm. The first server to receive a request from a given client typically generates the session ID. After a server creates a session for a client, the server generates a session ID to uniquely represent that session, and instructs the client to return the generated session ID in subsequent requests from that client. For example, a session ID may be encoded in the URLs the client is instructed to access or it may be stored in a server-generated cookie the client is instructed to send back to the server with each request.

Requests may be routed between the clients and the servers through one or more devices, which may be considered upstream from the servers and downstream from the clients. These devices may be part of the server farm or may operate within the network or other system. For example, the server farm may include one or more routers that receive the requests from the network and route them to servers.

The work that a server performs processing requests it receives is referred to as the load of that server. Depending on the allocation of requests and the processing required, the load may differ widely between servers and limit performance. Another example of upstream devices is load balancers. In order to distribute load across a plurality of servers within a server farm, load balancers may be used. Load balancers may be additional devices, may be part of other devices, or may include other functionality. For example, load balancers may receive incoming requests to the server farm and route the requests to individual servers in addition to determining where requests may be sent to better balance loads in the server farm.

In some systems, a load balancer or other device may be configured to receive incoming requests, examine them for a session ID, and then route them to the server that generated the session ID so that session information is kept on a single server within the server farm. The technique of using the session ID to select the server that will service a given request is called "sticky sessions", "sticky load balancing", or "sticky routing" since the presence of a session ID causes the requests associated with that session to "stick" to a specific server.

Some systems may include load balancers or other devices in the server farm that receive requests and send them to servers. These devices may maintain a mapping of session IDs to servers. These devices may then compare the session IDs with the requests to their mapping information to find the corresponding server. However, the size of the data for the mapping may be prohibitive as there may be many session IDs—at least one per client of the server farm.

In some systems, servers may provide their address, such as an Internet hostname or address, to clients so that the client or devices within the server farm, such as load balancers, may use that information to route subsequent requests using standard Internet routing protocols to the corresponding server. However, exposing the server addresses or other details of the sever farm configuration communicates information about the internal arrangement of the server farm to the client or others outside the server farm. As the client is typically a distrusted third party, exposing information about the internal operation of the server farm may be a security risk.

Alternatively, an administrator may configure a load balancer and servers with a particular ID corresponding to each server as identifying information. Servers may then include this identifying information in their session ID without revealing information about the internal structure of the server farm. However, the load balancer and server must then share data that allows the load balancer to target a specific server from the identifying information. This implementation imposes a burden on server farm administrators, as configuration information for these session IDs is then maintained for all load balancers and servers.

SUMMARY

A system and method is provided to enable upstream devices, such as a load balancer, router, or other device upstream from servers within a server farm, to perform sticky routing of session requests. In particular, upstream devices may be configured to receive requests within particular sessions and send them to the servers handling those sessions using one or more unique identifying data (unique IDs) identifying how requests may be sent downstream through the server farm. Upstream devices may include a list of downstream devices, including servers, to which they may send incoming requests. The unique IDs may be dynamically generated by the upstream devices through which travels a request that is not already associated with a session on a server of the server farm, indicating how the received request may be sent downstream through the server farm. Upstream devices may automatically perform the unique ID generation in response to receiving requests.

A server handling a request without an associated session may form a session ID to identify a session for a client and return that session ID to the client that originated the request. The server also returns a unique ID identifying itself as the server that generated the session ID. This unique ID may be, or may be generated from, the unique ID(s) received with the request from upstream device(s). The unique ID may be returned to the client as part of the session ID or as a separate ID. The client may then use the session ID and unique ID with requests within that session it sends to the server farm. Upon receiving requests corresponding to established sessions, upstream devices may use the unique ID to send the request downstream. For example, a unique ID sent downstream with a request by an upstream device may indicate the downstream device to which the request is being sent, so that the server may send requests with a session ID and that unique ID to the same downstream device.

Upstream devices may determine the information that may be used to uniquely identify the downstream server. This information may be communicated to servers or any downstream device with each request. The information may be included, embedded, or encoded within the request to reach servers. For example, an upstream device may use URL rewriting, cookies, headers, body, or new fields of the request, or other computing element that may be used to store session IDs. Servers may use similar techniques to get session IDs and the unique ID(s) to clients.

When sending a received request associated with a session, each upstream device may extract information that identifies the device immediately downstream from it or the communication channel to use. For example, the received request may include a session ID and one or more unique IDs and the upstream device may find the relevant unique ID to enable it to determine where to send the request. The upstream device may then use this information to send the request to the appropriate next device in the server farm, enabling sticky routing for requests associated with a given session across multiple tiers or nodes within a server farm. A server may store distinct sets of session information associated with multiple clients. In one embodiment, the session information associated with a given client may be stored on a plurality of servers.

In one embodiment, upstream devices may also encrypt at least part of the unique IDs provided to the server. In one embodiment, the server may encrypt at least part of the unique ID or session ID before sending the session ID and unique ID to the client. In one embodiment, the unique ID may be included within the session ID and encryption may be performed on the whole of the session ID. Various encryption schemes may be used to encrypt the data, provided that however the data is encrypted upstream devices are configured to be able to decrypt at least enough of the data to use for sending requests downstream.

In one embodiment, a system may include an upstream device configured to receive client requests and a plurality of servers coupled to the upstream device and configured to store session information. For each client request not associated with an established session, the upstream device may be configured to select one of the plurality of servers and send that client request to that server with unique information identifying that server. In response to each client request not associated with an established session, each of the servers may be configured to generate a session ID and send the session ID and the unique identifying information received from the upstream device to the client. In response to client requests associated with an established session, the upstream device may be configured to send the client requests to the one of the plurality of servers indicated by the unique identifying information included with the client requests.

In one embodiment, a method may include an upstream device receiving a client request and, if the client request is associated with an established session, the upstream device may send the client request associated with an established session to the one of the plurality of servers indicated by the information included within a session ID associated with the request. Otherwise, if the client request is not associated with an established session, the upstream device may select one of a plurality of servers and send the client request to the server with unique information identifying the server, and the server may generate a session ID including the unique identifying information received from the upstream device in response to the client request not associated with a session ID and send the session ID to the client. In other embodiments, the unique identifying information may be separate from the session ID. For example, the unique identifying information and session ID may be in separate cookies.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS OF THE INVENTION

A system and method is provided to enable upstream devices, such as a load balancer, router, or other device upstream from servers within a server farm, to perform sticky routing of session requests. The system and method may be implemented as part of a server farm for computer system such as e-commerce sites, ticket offices, banks, or other organizations processing client requests in sessions, for example using shopping carts, to provide secure interactions, or may otherwise interact across multiple requests with clients. Upstream devices from servers in a server farm may be switches, routers, hubs, other servers, or any other computing device that may receive and send requests. The system and method may be described with reference to a load balancer as the upstream device as an example.

Figure 1:
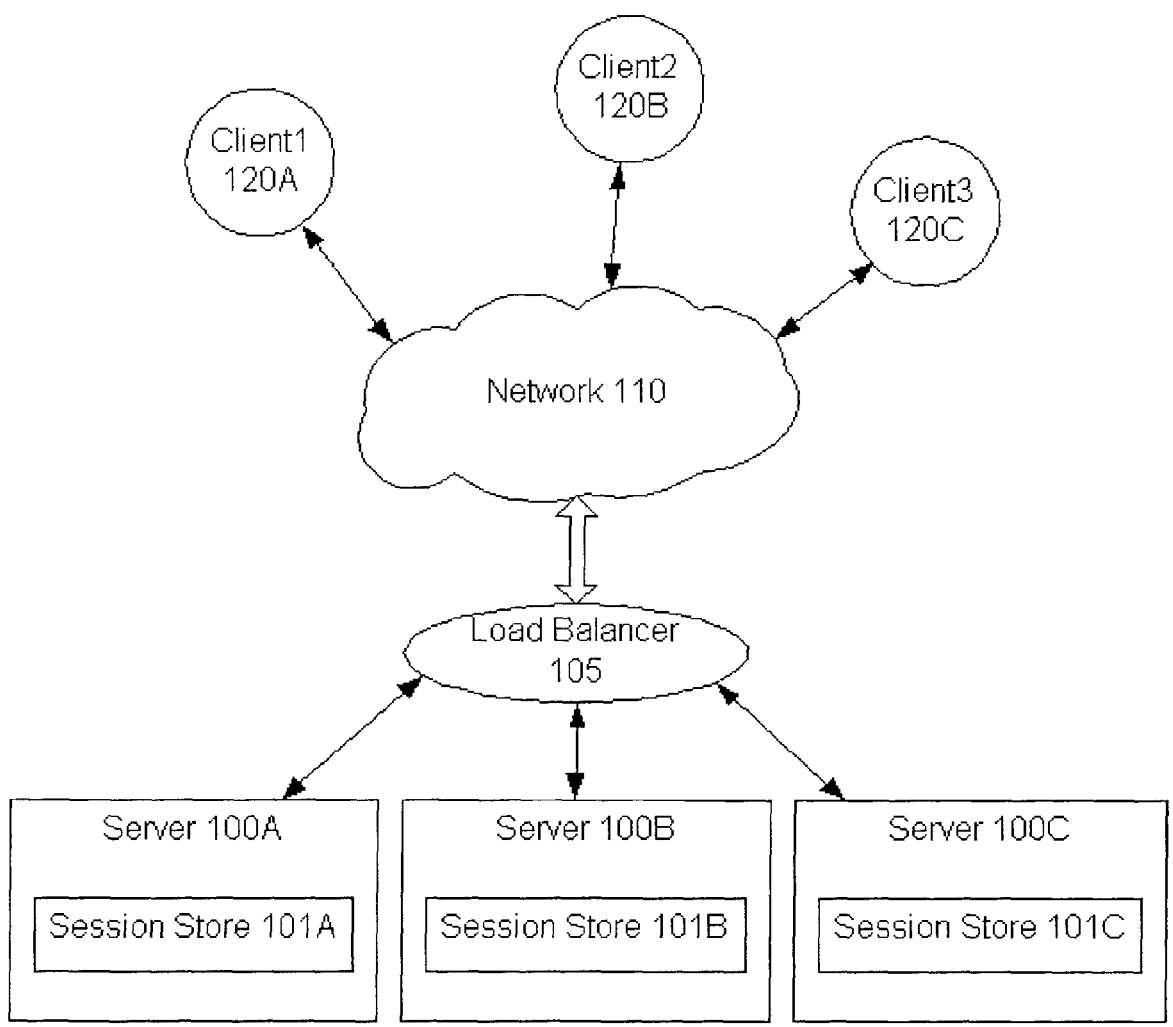
FIG. 1 illustrates a computer system including a load balancer according to one embodiment.

As illustrated in FIG. 1, in one embodiment a sever farm may include servers 100 downstream from a load balancer 105. The load balancer 105 may be any router, server, or other device configured to perform sticky load balancing while sending requests from clients downstream to servers 100. The servers 100 may be any devices configured to handle requests from clients and to store session information associated with one or more clients in session stores 101. Clients 120 may be any device configured to generate requests and send them through the network 110 to the server farm as well as receive data or other communications from the server farm through the network 110. Network 110 may be a local area network, a wide area network, a collection of different networks, the Internet, or another interconnected system of computing devices.

Servers 100B and 100C may store session information corresponding to clients 120 in session stores 101. Upon receiving a request from one of the clients, according to one embodiment the load balancer 105 determines whether the request has an associated session. In particular, the load balancer 105 may examine the received request for an associated session ID or other data in the request indicating that it has an associated session directly or indirectly. For example, a session ID identifying a session may include data providing information for sending a request downstream through the server farm to a server, indicating that a session associated with the request may be stored on that server.

If the load balancer 105 determines that a received request is not associated with a session, the load balancer may select a downstream server and send the request downstream to that device with a unique value identifying the downstream device. For example, load balancer 105 may receive a request from client 120C, which has no associated session in the server farm as illustrated in FIG. 1. The load balancer 105 may select server 100A to process the request, for example according to its configuration to provide load balancing. The load balancer 105 may then send the request to server 100A with a unique ID identifying server 100A as the recipient. The load balancer 105 may generate the unique ID or select it from accessible data stores. For example, load balancer may access a list of servers in the server farm or use handles referring to its available downstream connections to generate the unique ID.

The load balancer 105 may update or store information to indicate that the load of the servers, in particular the load on server 100A, may have changed. In one embodiment, the load balancer 105 may inform one or more other devices in the server farm of the load change, for example through distributed or shared memory storing loading information or by sending a communication to the other devices.

If the load balancer 105 determines that a received request is associated with a session, the load balancer may send the request to the server 100 storing the corresponding session information in its session store 101. For example, load balancer 105 may receive a request from client 120C with an associated session ID and one or more unique IDs indicating how the request may be sent downstream in the server farm. The session ID and unique ID(s) may be part of the request, for example embedded or encoded within the request. Load balancer 105 may identify server 100A from the unique ID(s) and may send the request to server 100A. In some embodiments, the unique ID(s) may be part of or included within the session ID. In other embodiments, the unique ID(s) may be separate from the session ID.

According to one embodiment, upon receiving a request from an upstream device, a server 100 may determine whether the request has an associated session, which may be similar to that performed by the load balancer 105 above. In particular, a server 100 may determine whether there is one or more unique IDs associated with the request received that upstream devices may have added, indicating that this is a request without an associated session. Alternatively, for example, the server 100 may search for a session ID or may instead, or also, try and match the request with one of the session data 102 in its session store 101, for example according to data associated with the request (such as "From" or "To" fields).

If the server 100 finds a corresponding session, the server may process the request. Processing the request may involve operations internal to the server 100 and/or communicating with one or more other devices, which may be outside the server farm. If the server 100 does not find a corresponding session, the server 100 may create a session, session ID and unique ID based on the one or more unique IDs the server 100 may have received with the request. In one embodiment, creating a session may involve setting aside some resources, such as memory space, in the session store 101A. The server 100 may then send the session ID to the client that originated the request. The response may also include any data responsive to the request received by the server 100.

Figure 2:
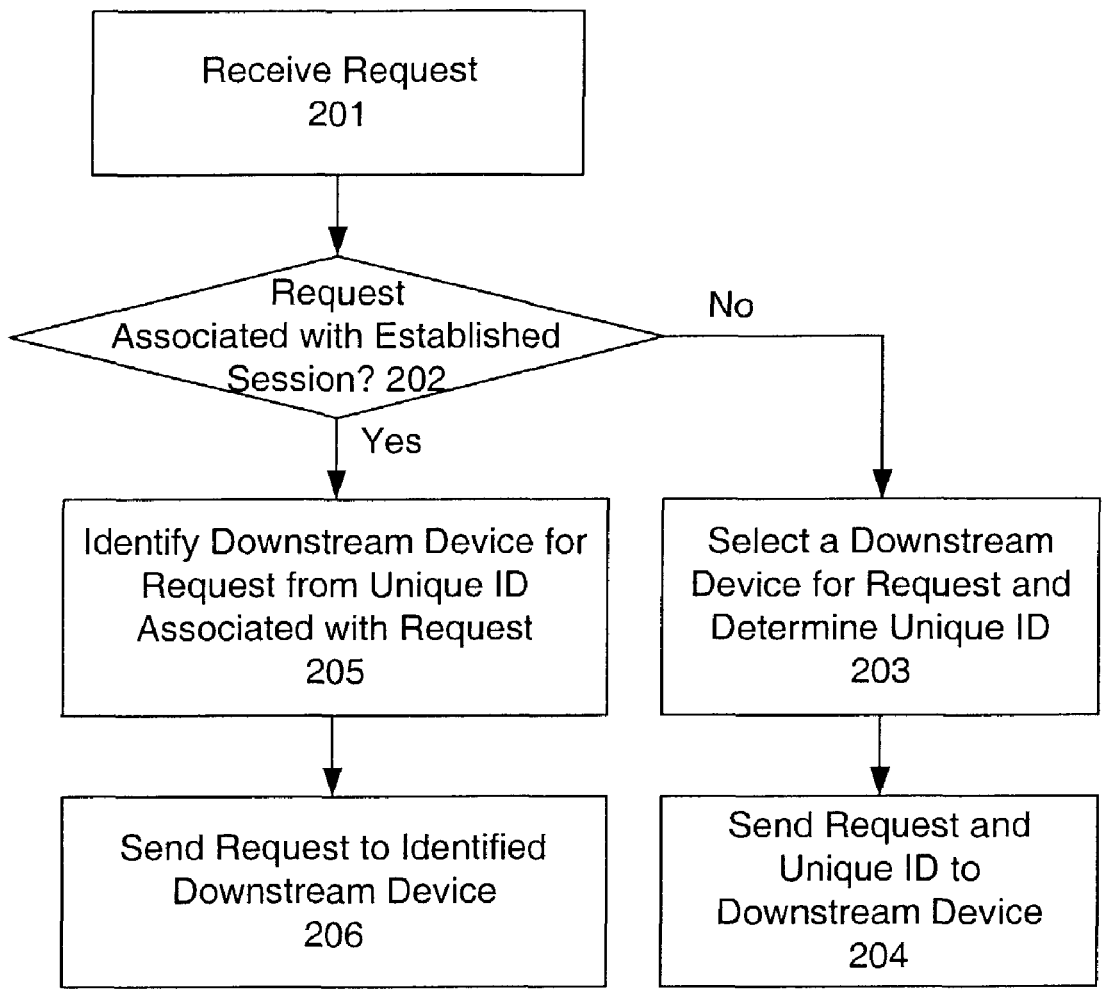
FIG. 2 illustrates a method for a load balancer to handle requests for servers according to one embodiment.

FIG. 2 illustrates a method for handling client requests in a system having a plurality of servers, such as the system of FIG. 1. An upstream device, such as a load balancer, may receive a client request, as indicated at 201. The upstream device may receive the request from a client through a network such as the Internet. The upstream device may then determine whether the received request is associated with an established session, as indicated at 202.

If the request is not associated with an established session, the upstream device may select a server to which to send the request and may determine a unique ID, such as an address or other data identifying the selected server, as indicated at 203. The upstream device may select the server to which to send the request based on a desired server destination the upstream device wishes the request to reach, for example to attempt to balance server load in the server farm. The upstream device may then send the request and the unique ID to the downstream device, as indicated at 204. In one embodiment, the unique ID may be embedded in the request.

If the request is associated with an established session, the upstream device may identify the downstream device to which the request may be sent from the unique ID associated with the request, as indicated at 205. In one embodiment, the unique ID is part of a session ID received with the request. The unique ID may be identical to a unique ID sent by a upstream device to a server with a preceding request. The upstream device may send the request to the downstream device identified, as indicated at 206.

Figure 3A:
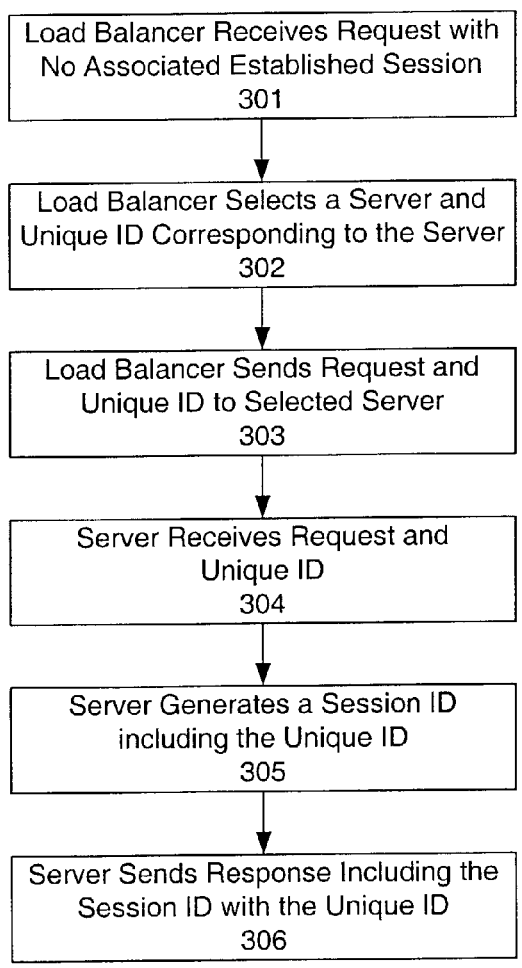
FIGS. 3A and 3B illustrate a method for handling requests through a server farm according to one embodiment, depending on whether they are associated with an existing session.

FIG. 3A illustrates a method for handling a client request that is not associated with an existing session through a server farm according to one embodiment, for example as illustrated in FIG. 1. A load balancer as described for FIG. 1 may receive a client request without an associated established session, as indicated at 301, which may be from a client across a shared network or collection of networks. In one embodiment, the load balancer includes or has access to data indicating downstream devices to which it is connected and/or information on the load of these downstream devices. The load balancer is configured to select a server and unique ID corresponding to the selected server, as indicated at 302. For example, the load balancer may access data it stores or has access to, and determine to which downstream device it may send the request. In one embodiment, the load balancer may take into account the memory or processor use, the number of requests assigned, and/or the number of sessions handled by a server. The unique ID selected is configured to indicate information for selecting the server, so that received requests that include the unique ID may be sent to the same server in the server farm. For example, the unique ID may refer to a value given by the load balancer to the downstream device, may refer to some virtual network connection, or some other data that indicates to that upstream device one of its downstream devices. The load balancer may then send the request with the unique ID to the selected server, as indicated at 303.

The server may receive the request and unique ID sent by the load balancer, as indicated at 304. The server may generate a session ID including the unique ID it received from the load balancer with the request, as indicated at 305, so that the session ID not only identifies a session but also provides information for upstream devices to identify the particular server handling the session. For example, the server may encode the unique ID within the session ID. Typically, the server may include the unique ID information within the session in any way that still enable upstream devices to extract or decode that information from session IDs they receive with subsequent requests. The server may then send a response that includes the session ID with the unique ID, as indicated at 306, to the client that originated the request. In other embodiments, instead of incorporating the unique ID within the session ID, the unique ID and session ID may be sent as separate IDs.

Figure 3B:
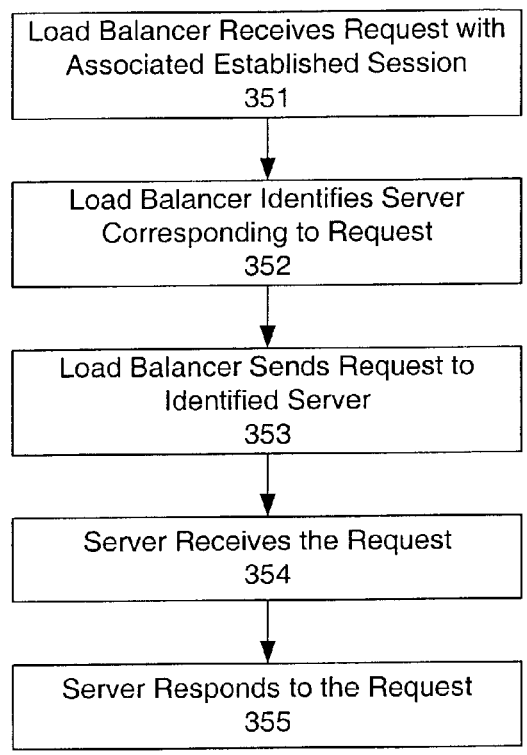

FIG. 3B illustrates a method for handling a request that is associated with an existing session through a server farm according to one embodiment, for example as illustrated in FIG. 1. A load balancer may receive a request with an associated established session, as indicated at 351. The request may include a session ID and one or more unique IDs. Each unique ID may have been generated by one of the upstream devices of the server farm. The unique ID(s) may describe a path through the server farm down to the server configured to handle the request, for example the server that stores the corresponding session data for the client that generated the request. The load balancer may then identify from a unique ID received with the request the server corresponding to request, as indicated at 352. In one embodiment, an upstream device may decode or extract the unique ID from the session ID, for example according to a configuration compatible with the encoding performed by the server when generating the session ID. The load balancer may send the request to the identified server, as indicated 353. Upon receiving the request, as indicated at 354, the server may respond to the request, as indicated at 355.

Figure 4:
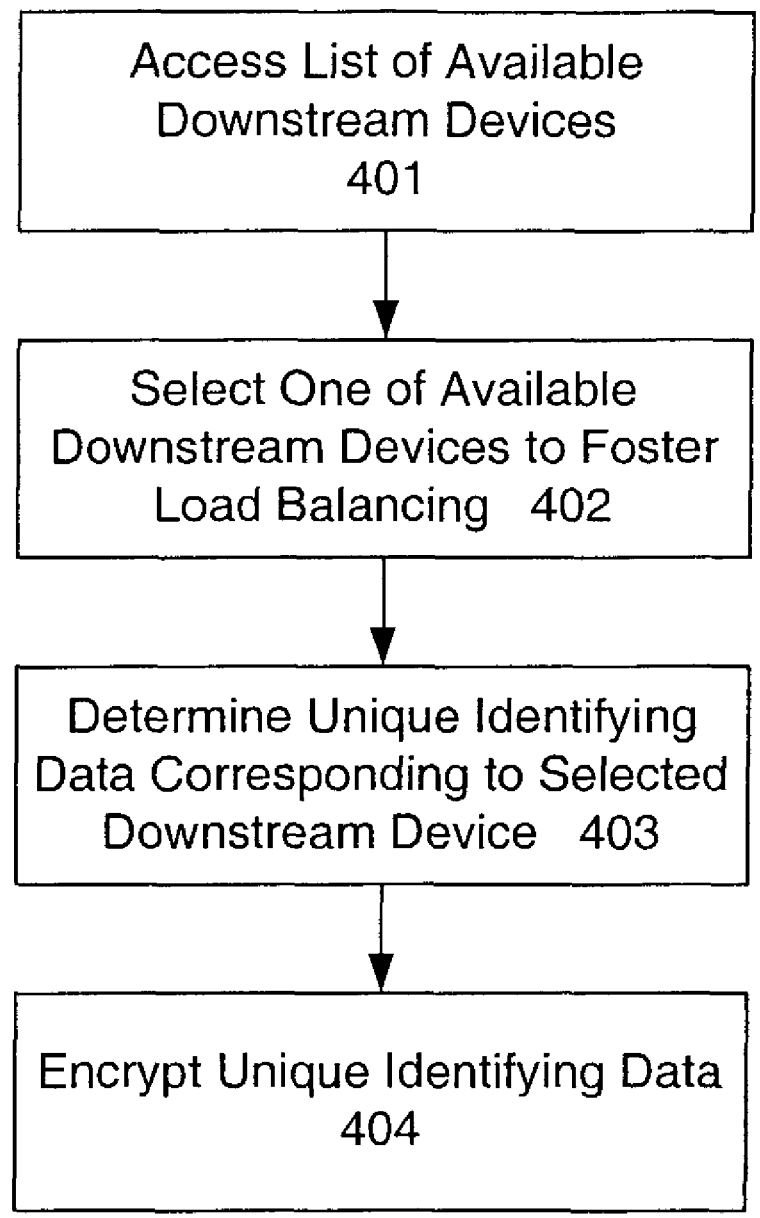
FIG. 4 illustrates in more detail a method for handling a request not associated with an existing session according to one embodiment.

FIG. 4 illustrates in more detail selecting a downstream device to which to send a request not associated with an established session and determining a unique ID, for example as indicated at 203 in FIG. 2. A list of available downstream devices may be accessed, as indicated at 401, to determine the routing options and select one of the available downstream devices to which to send the request, as indicated at 402. One of the routing options may be selected according to the load of the servers in the server farms to get the request processed by a server with a lesser load than other servers. A unique ID identifying the route and/or the downstream device to receive the request may be determined, as indicated at 403.

The unique ID may then be encrypted to provide additional security against undesired disclosure, as indicated at 404. In one embodiment, a cryptographic hash function or other mechanism may be implemented to encode the information that uniquely identifies a given server, such that the information still allows a load balancer to uniquely identify the server but cannot be retrieved by clients. In one embodiment, the unique ID may be an Internet hostname or address and the hash function or other mechanism may be tailored for encoding data in the format of Internet hostnames or addresses. In one embodiment, the unique ID may be incorporated within the session ID and the entire session ID may be encrypted. In other embodiments, only the unique ID is encrypted. In some embodiments, the unique ID may be separate from the session ID.

A load balancer may perform at least part of the handling of a non-associated request as illustrated by FIG. 4. In one embodiment, the encryption may be performed by the server downstream from the load balancer according to an encryption scheme that is compatible with the load balancer. For example, the server may receive unique IDs with the request from upstream devices, may encrypt at least part of the unique IDs according to a scheme that may be decrypted by one or more of the upstream devices within the server farm, and may then include the encrypted unique ID as part of a session ID or as a separate ID. In one embodiment, a server may collate or otherwise compile received unique IDs and encrypt them as a whole.

Figure 5:
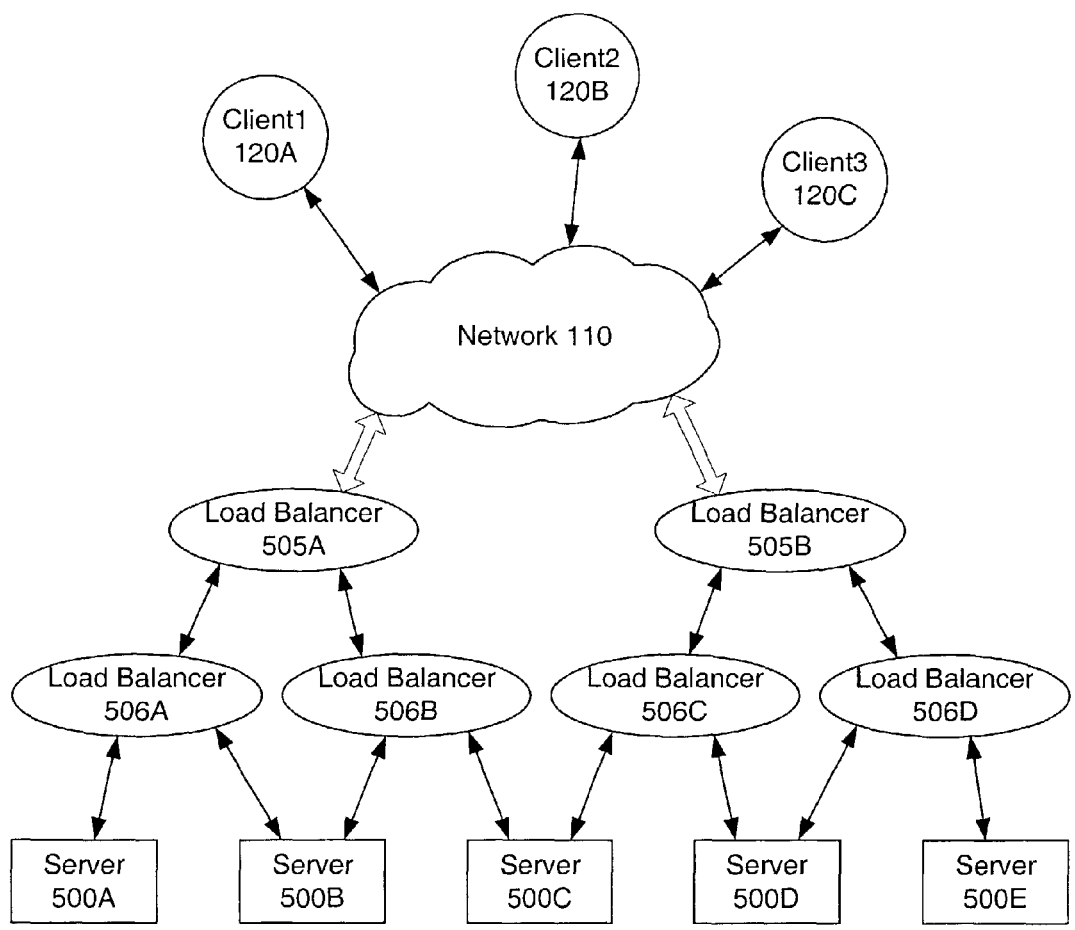
FIG. 5 illustrates a computer system including a plurality of load balancers in a plurality of layers according to one embodiment.

The server farm may include one or more layers of devices for requests to travel through before reaching servers. FIG. 5 illustrates a computer system including a plurality of load balancers 505 and 506 as upstream devices in a plurality of layers according to one embodiment. In one embodiment, different connectivity between a plurality of devices in a plurality of layers that enable routing of request received by the server farm from client 120 through the network 110 to the servers 500 may be implemented.

In one embodiment, each load balancer 505 and 506 may receive requests from an upstream device and send them to a downstream device relative to themselves. Where there is no associated established session with a received request, the load balancer may also determine and transmit a unique ID providing information about the path taken by the request through the server farm. For example, a request from client 120A may travel through the network 110 to load balancer 505B. Load balancer 505B may then select load balancer 506C and send the request to load balancer 506C with a unique ID. Load balancer 506C may receive the request and unique ID and may send them to server 500D, along with another unique ID it may generate. Each unique ID may indicate part of the path taken by the request through the server farm and may enable load balancers 505B and 506C to perform communication along that path through the server farm.

In one embodiment, received requests may have an associated established session and the load balancers may use the unique ID(s) include with the request to select a downstream device and send the request to the selected downstream device. In one embodiment, the unique ID(s) may be part of the session ID. For example, a request with a session ID including unique IDs may travel from client 120A through the network 110 to load balancer 505B. A load balancer may determine from the unique IDs the downstream device to which it should send the client request and it may send the client request downstream according to the unique ID.

For example, load balancer 505B may receive the request with a session ID including the unique ID it generated above to indicate load balancer 506C. Load balancer 505B may then send the client request to load balancer 506C with the session ID. In one embodiment, a load balancer may update, modify, or delete at least part of a session ID before sending it downstream with a request. For example, load balancer 505B may delete the unique ID it used from the session ID, or it may rearrange it so that it is at the end of the session ID, in accord with possible expectations of the downstream device receiving the session. In one embodiment, a load balancer may expect unique IDs in a particular part of the session ID and/or it may expect the unique ID it is to use at the start of the session ID. Other devices upstream from servers may perform similar functions. For example, load balancer 506C may receive the request with the session ID from load balancer 505B. The session ID with the unique ID(s) may indicate to load balancer 506C to send the request to server 500D. Load balancer 506C may then send the request to server 500D. Load balancer 506C may also update, amend, or delete part of the session ID. Servers 500 may be configured to identify the corresponding session after changes to the session ID by upstream devices.

Figures 6A, 6B:
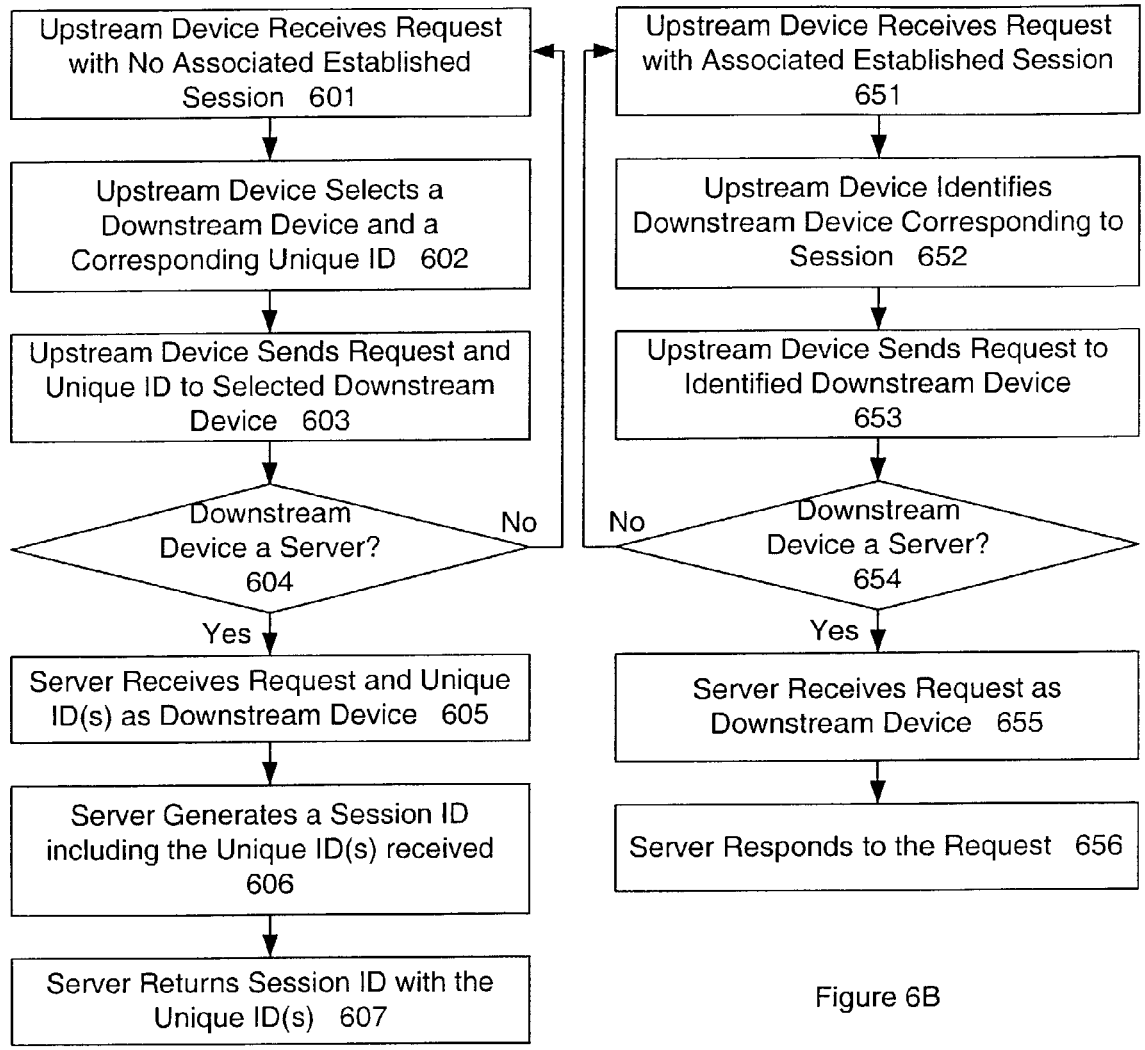
FIGS. 6A and 6B illustrate a method for handling requests through a server farm with one or more layers for requests to travel before reaching servers according to one embodiment, depending on whether they are associated with an existing session.

FIG. 6A illustrates a method of handling requests not associated with an established session traveling through a server farm with one or more layers of upstream devices, such as load balancers, before reaching servers, for example as illustrated in FIG. 5, according to one embodiment. After entering the server farm, a request may move through one or more devices upstream from the server that may handle it.

An upstream device may receive a request that does not have an associated established session, as indicated at 601. For example, the request may not have a corresponding session ID. The upstream device may then determine where to send the request, selecting a downstream device according to its configuration, as indicated at 602. In one embodiment, the load balancer may select one of the downstream devices according to the load of the downstream servers. The load balancer may generate a corresponding unique ID, as indicated at 602, indicating the selected downstream device. In one embodiment, the upstream device receiving a request with a unique ID may append the unique ID it generated with the unique ID received to obtain a combined unique ID. Alternatively, instead of appending unique IDs, upstream devices may merge, encode, or derive new unique IDs from a plurality of other unique IDs. Upstream devices may thus dynamically generate unique IDs for received requests automatically. The downstream device may then send the request and the unique ID(s) generated to the selected downstream device, as indicated at 603.

If the downstream device is not a server, the receiving device may operate as another device upstream from the server and perform similar handling of the request as indicated at 604. When a server receives the request, it may also receive one or more unique ID(s), as indicated at 605, depending on the number of upstream device through which the request traveled and/or how each upstream device handled unique IDs. The server may then generate a session ID to identify session data for the client that generated the request. The server may include in the session ID the unique ID(s) it received, as indicated at 606. For example, the server may include the unique ID(s) as part of the session ID, or otherwise include that information provided that the upstream devices are configured to handle the session ID generated to recognize and/or extract the information they generated and sent to the server. The server may then send the session ID with the unique ID(s) to the client that originated the request, as indicated at 607. In other embodiments, the server may provide the unique ID separately from the session ID. For example, the server may provide the unique ID and session ID within two separate cookies.

FIG. 6B illustrates a method of handling requests associated with an established session traveling through a server farm with one or more layers of upstream devices before reaching servers, for example as illustrate in FIG. 5, according to one embodiment. An upstream device may receive a request with an associated established session, as indicated at 651. The upstream device may identify a downstream device corresponding to the session associated with the received request, as indicated at 652, to which to route the request. The upstream device may identify the relevant downstream device using a unique ID associated with the request. For example, the upstream device may use a unique ID of the session ID received that indicates to which of the downstream device to which it is connect the request may be sent. In other embodiment, the unique ID may be provided in the request separate from the session ID. The upstream device may then send the request to the identified downstream device, as indicated at 653. If the downstream device is not a server, the receiving device may operate as another device upstream from the server and perform similar handling of the request, as indicated at 654. When a server receives the request, as indicated at 655, the server may responds to the request, as indicated at 656. The server may use or update session information to respond to the request.

There are various ways in which an upstream device in a server farm may include unique ID(s) with requests it received. In one embodiment, client request URLs, some headers, the body, or other elements of the client request may be manipulated. For example, a client request URL may be rewritten to encode information describing the route the request is taking or its destination, thereby including the unique ID as part of the request framework or content. This information may be modified or appended to update its status and keep the information correct and relevant as the request travels across the server farm.

In one embodiment, unique IDs transmitted with a request associated with a session may be manipulated while the request is in transit to reflect the current position within the server farm of the request and facilitate routing through multiple layers. For example, in one embodiment load balancers in a server farm may be configured to use the first unique ID received with a request to determine to which downstream device the load balancer may send the request. A load balancer may then delete the unique ID it used, or rearrange it, before sending on the request. In other embodiments, load balancers may expect unique IDs in a particular part of the session ID and may be configured to ensure that the session ID has been updated to conform with the configuration of subsequent receivers.

A client farm with upstream devices, such as load balancers, configured to receive client requests with session IDs and unique IDs that were dynamically generated automatically for a previous request, may provide sticky routing of session requests without administrator supervision. A client farm configured as described above may also enable routing of client requests through the server farm without upstream devices storing mapping information and/or exchanging mapping information. The configuration of the server farm may enable the session ID and unique ID to not disclose implementation details of the server farm, such network addresses, to be exposed to clients.

Various embodiments may further include receiving, sending, or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system, comprising:
    an upstream device configured to receive client requests; and
    a plurality of servers coupled to the upstream device and configured to store session information;
    wherein the upstream device is configured to select one of the plurality of servers for each client request not associated with an established session and provide the respective client request to the selected server with unique identifying information to be provided to the client, wherein the unique identifying information is usable to identify the selected server;
    wherein said upstream device is comprised within a hierarchy of upstream devices configured to route the client requests to the servers; wherein the hierarchy of upstream devices is configured to generate said unique identifying information to identify each upstream device through which a client request was routed to the corresponding server if the client request is not associated with an established session;
    wherein each of the servers is configured to generate a session ID and send the session ID and the unique identifying information received from the upstream device to the client in response to each client request not associated with an established session; and
    wherein the upstream device is configured to send the client requests associated with an established session to one of the plurality of servers indicated by unique identifying information included with the client requests.

2. The system as recited in claim 1, wherein the upstream device comprises a load balancer configured to select one of the servers to send each client requests not associated with an established session according to a load of each server.

3. The system as recited in claim 1, wherein each of the plurality of servers comprises a web server, and wherein the client requests comprise requests received from web clients over the Internet, wherein the web servers are configured to respond to the requests from web clients.

4. The system as recited in claim 3, wherein each server is configured to store session state information for each session that server has established with a web client.

5. The system as recited in claim 1, wherein said unique identifying information is encrypted so as to not be available to clients sending the client requests.

6. The system as recited in claim 1, wherein said unique identifying information is encoded in each session ID and comprises a network address for the corresponding server.

7. The system as recited in claim 1, wherein said unique identifying information is generated by the upstream device.

8. The system as recited in claim 1, wherein the upstream device is configured to modify a URI of a client request to include said unique identifying information and send the client request to the corresponding server if the client request is not associated with an established session.

9. The system as recited in claim 1, wherein-the upstream device is configured to modify or insert a header in a client request to include said unique identifying information and send the client request to the corresponding server if the client request is not associated with an established session.

10. The system as recited in claim 1, wherein the upstream device is configured to modify a body of a client request to include said unique identifying information and send the client request to the corresponding server if the client request is not associated with an established session.

11. The system as recited in claim 1, wherein each upstream device is configured to examine unique identifying information included with a client request to determine which upstream device or server the client request is to next be routed if the client request includes a session ID.

12. A method, comprising:
    an upstream device receiving a client request; and
    determining whether the client request is associated with an established session;
    the upstream device selecting one of a plurality of servers and providing the client request to the selected server with unique identifying information to be provided to the client if the client request is not associated with an established session, wherein the unique identifying information is usable to identify the selected server, wherein the upstream device is comprised within a hierarchy of upstream devices configured to route client requests to the servers; and
    the selected server providing a session ID and the unique identifying information received from the upstream device in response to the client request if the client request is not associated with an established session and sending the session ID and the unique identifying information to the client;
    the upstream device sending the client request to the one of the plurality of servers indicated by unique identifying information associated with the client request if the client request is associated with an established session.

13. The method as recited in claim 12, wherein said selecting comprises selecting to balance the load of each server in the plurality of servers.

14. The method as recited in claim 12, wherein said server generating and sending comprises a web server responding to the client request, wherein the client request is from a web client over the Internet.

15. The method as recited in claim 14, further comprising the server establishing a session with the web client and storing session state information for the session.

16. The method as recited in claim 12, further comprising encrypting said unique identifying information so as to not be available to a client sending the client request.

17. The method as recited in claim 16, wherein said unique identifying information is included in each session ID and comprises a network address for the corresponding server.

18. The method as recited in claim 12, further comprising the upstream device generating said unique identifying information.

19. The method as recited in claim 12, further comprising the upstream device modifying a URI of the client request to include said unique identifying information if the client request is not associated with an established session.

20. The method as recited in claim 12, further comprising the upstream device modifying or inserting a header in the client request to include said unique identifying information if the client request is not associated with an established session.

21. The method as recited in claim 12, further comprising the upstream device modifying a body of the client request to include said unique identifying information if the client request is not associated with an established session.

22. The method as recited in claim 12, further comprising the hierarchy of upstream devices generating said unique identifying information to identify each upstream device through which the client request was routed to the corresponding server if the client request was not associated with an established session.

23. A computer-readable storage medium, comprising computer instructions configured to implement:

an upstream device receiving a client request; and the upstream device determining whether the client request is associated with an established session;

the upstream device selecting one of a plurality of servers if the client request is not associated with an established session and providing the client request to the selected server with unique identifying information to be provided to the client, wherein the unique identifying information is usable to identify the selected server, wherein the upstream device is comprised within a hierarchy of upstream devices configured to route client requests to the servers; and the upstream device sending the client request to one of the plurality of servers indicated by the unique identifying information provided with the client request if the client request is associated with an established session.

24. The computer-readable storage medium as recited in claim 23, wherein said selecting comprises selecting to balance the load of each server in the plurality of servers.

25. The computer-readable storage medium as recited in claim 23, wherein the computer instructions are further configured to implement encrypting said unique identifying information so as to not be available to a client sending the client request.

26. The computer-readable storage medium as recited in claim 25, wherein said unique identifying information is included in each session ID and comprises a network address for the corresponding server.

27. The computer-readable storage medium as recited in claim 23, further comprising the upstream device generating said unique identifying information.

28. The computer-readable storage medium as recited in claim 23, wherein the computer instructions are further configured to implement the upstream device modifying a URI of the client request to include said unique identifying information if the client request is not associated with an established session.

29. The computer-readable storage medium as recited in claim 23, wherein the computer instructions are further configured to implement the upstream device modifying or inserting a header in the client request to include said unique identifying information if the client request is not associated with an established session.

30. The computer-readable storage medium as recited in claim 23, wherein the computer instructions are further configured to implement the upstream device modifying a body of the client request to include said unique identifying information if the client request is not associated with an established session.

31. The computer-readable storage medium as recited in claim 23, wherein the computer instructions are further configured to implement the hierarchy of upstream devices generating said unique identifying information to identify each upstream device through which the client request was routed to the corresponding server if the client request is not associated with an established session.

\* \* \* \* \*

UNITED STATES PATENT AND TRADEMARK OFFICE
CERTIFICATE OF CORRECTION

| | | |
|---|---|---|
| PATENT NO. | : 7,774,473 B2 | Page 1 of 1 |
| APPLICATION NO. | : 10/209039 | |
| DATED | : August 10, 2010 | |
| INVENTOR(S) | : Christopher H. Elving and Arvind Srinivasan | |

It is certified that error appears in the above-identified patent and that said Letters Patent is hereby corrected as shown below:

In the Claims:

Claim 26, col. 14, line 2, please delete "25" and insert --23-- in place thereof.

Signed and Sealed this

Fifth Day of October, 2010

David J. Kappos
*Director of the United States Patent and Trademark Office*